No. 703,315. Patented June 24, 1902.
S. N. SMITH.
APPARATUS FOR MANUFACTURING ICE.
(Application filed Nov. 11, 1901.)
(No Model.)
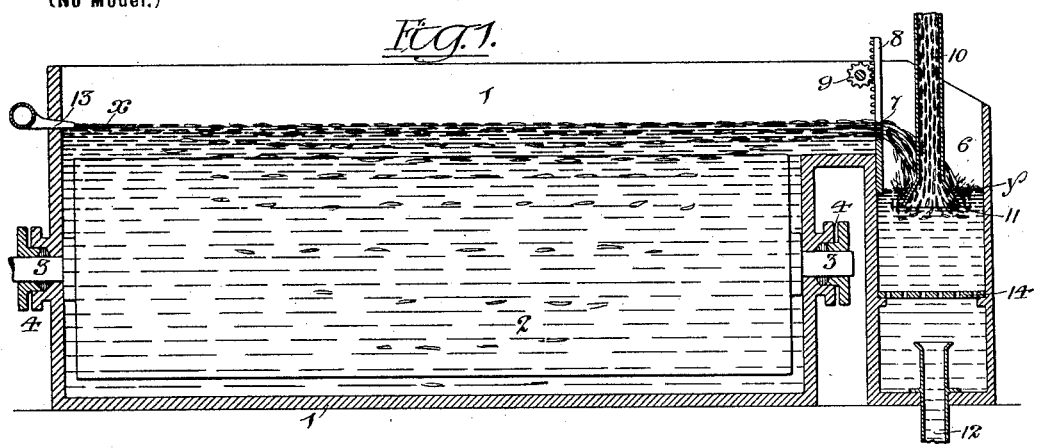
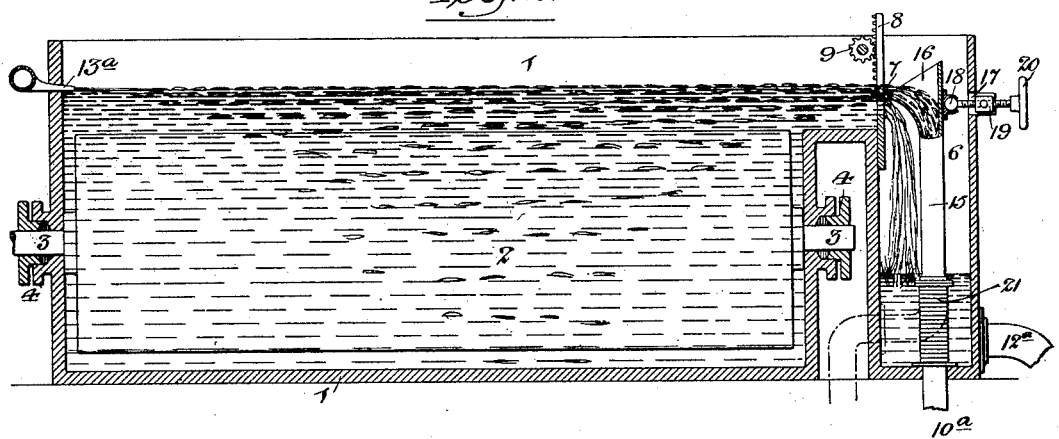
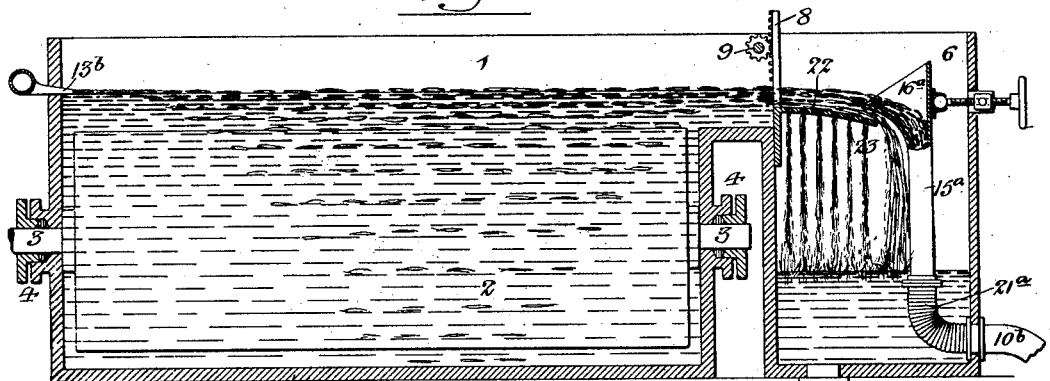
Witnesses:— Inventor:—
Hamilton T. Turner Sommers N. Smith
Herman E. Metius by his Attorneys:
Howson & Howson

UNITED STATES PATENT OFFICE.

SOMMERS N. SMITH, OF PHILADELPHIA, PENNSYLVANIA.

APPARATUS FOR MANUFACTURING ICE.

SPECIFICATION forming part of Letters Patent No. 703,315, dated June 24, 1902.

Application filed November 11, 1901. Serial No. 81,909. (No model.)

*To all whom it may concern:*

Be it known that I, SOMMERS N. SMITH, a citizen of the United States, residing in Philadelphia, Pennsylvania, have invented certain Improvements in Apparatus for Manufacturing Ice, of which the following is a specification.

My invention relates to certain improvements in that form of apparatus for manufacturing ice shown and described in my application for patent filed August 5, 1901, Serial No. 71,001, the object of my present invention being to facilitate the removal of the ice particles from the tank in which they are formed and their conveyance to the compression-chamber and at the same time to eliminate the excess of unfrozen liquid carried with or carrying such particles of ice, a further object of my invention being to eliminate the air usually present in the ice.

My invention is fully illustrated in the accompanying drawings, in which—

Figure 1 is a sectional view of one form of apparatus embodying my present improvements. Fig. 2 is a similar sectional view illustrating a detail of my invention; and Fig. 3 is another sectional view, similar to Figs. 1 and 2, illustrating a further detail of my invention.

As in my prior application, above referred to, I provide for and maintain within the freezing-tank a positive surface current that will insure the constant movement and rapid removal of the ice particles which float to the surface of the water contained within such tank after they have been scraped from the freezing-cylinder.

In the drawings herewith, 1 represents the freezing-tank filled with water to the point $x$, and 2 represents the freezing-cylinder upon which the ice is formed, of a character exactly similar to that described in my prior application, which freezing-cylinder is carried by the shaft or spindle 3, adapted to the stuffing-boxes 4, carried by the end walls of the freezing-tank. Suitable means are employed for scraping the ice from the surface of the freezing-cylinder.

Located adjacent to the freezing-tank and adapted to receive the water and ice particles conveyed by the surface current within said tank is the receiving-tank 6, the normal height of water therein being shown at the line $y$. Between the freezing-tank 1 and the receiving-tank 6 I mount an adjustable weir or gate 7, over which the mush of floating ice and water passes to said tank 6. For the purpose of adjusting this gate the racks 8 are provided, with which a suitable pinion 9 meshes, the latter being carried by a crank, so that movement may be imparted to raise or lower the gate. Any other suitable adjusting means may be employed in its stead. The ice from this receiving-tank is removed to the compressor by means of a suction-pump, and the pipe 10, leading from the suction-pump, extends into the mass of ice mush located within the tank 6, as shown in Fig. 1. I prefer to have the end of this pipe flaring, as shown at 11, and as it extends below the surface of the semiliquid mass, but only far enough to secure the floating ice particles therein, such ice will be carried to the compressor without any danger of air being carried therewith. Hence a better character of ice may be made by the use of this form of my apparatus. The surplus water within the tank 6 is being constantly removed through the pipe 12, located at the bottom of the tank, by means of a suitable pump arranged in any convenient position with relation to the freezing-tank, and this pump is connected with the delivery-spout 13, leading to the freezing-tank, whereby the water from the collecting-tank may be discharged into said tank to form the surface current therein. Midway between the suction-pipe 10 and the discharge-pipe 12 a screen 14 is located, consisting of a perforated plate, which prevents any discharge of the ice particles through said pipe 12. The adjustable weir or gate 7 between the freezing-tank and the receiving-tank regulates the height of water and floating ice passing into said receiving-tank, and by its use only a minimum quantity of water need be carried into the freezing-tank with the ice particles.

In Fig. 2 I have shown a form of apparatus in which the mass of floating ice may discharge directly into a pipe 15, from which it is conveyed by a suitable suction-pump to the compressor. In this form of apparatus I also provide an adjustable weir or gate 7, over which the mass of water and floating ice is carried, and by providing the pipe 15 with a spout 16, which extends across the receiving-tank, said spout may be so disposed as to receive directly the larger portion of the upper layer or mush of ice particles with a minimum quantity of water, while the surplus water carrying such ice particles passes directly into the tank 6. The pipe 15 is carried by an adjusting-screw 17, having a ball-and-socket connection 18 with said pipe at the sides, while the stem of said screw extends through a nut 19, mounted in the wall of the tank, and carries at its outer end an adjusting-handle 20. Any other suitable form of adjusting means may be employed. The lower part of this pipe has a flexible section 21, or in some instances I may substitute an ordinary swing-joint coupling. This flexible section connects with the pipe 10$^a$, leading to the compressor. The surplus water within the tank 6 is conveyed from the bottom of the same through the pipe 12$^a$ and is passed thence by means of a suitable suction-pump to the spout 13$^a$, delivering water to the freezing-tank to create the surface current therein.

In Fig. 3 of the sheet of drawings herewith I provide a receiving-tank 6, into which the surplus water carried with or carrying the ice particles passes, slightly larger than those shown in Figs. 1 and 2. In this form of apparatus I provide a perforated plate 22, over which the water and ice particles pass, and this plate is curved, so as to give a natural fall to the material passing over the same. At the outer end of this plate a pipe 15$^a$ is provided, having a spout 16$^a$ so arranged with relation to material passing over the plate 22 that the greater quantity of the ice particles will naturally flow into the same. This pipe is provided with suitable adjusting means and with a flexible lower connection 21$^a$, similar in all respects to that illustrated in Fig. 2. The plate 22 is preferably vertically adjustable in the same manner as the weir or gate 7 in order to regulate the height of the liquid mass passing over the same, which latter may vary according to the extent of ice formation. The plate 22 is perforated at 23, so that the greater part of the surplus water will fall through the same and not pass to the pipe 15$^a$. The surplus water collecting within the tank 6 passes out through the pipe 12$^b$ and is conveyed, by means of a suitable pump, to the discharge-spout 13$^b$.

In the forms of apparatus shown in Figs. 2 and 3 the spouts carried by the pipes 15 and 15$^a$ extend entirely across the tank or are sufficiently wide to receive the full flow of the material passing over the weir or gate.

Having thus described my invention, I claim and desire to secure by Letters Patent—

1. The combination in an apparatus of the character described, of the freezing-tank, ice-forming means located within said tank, a receiving-tank, means for removing the ice from the freezing-tank by discharging a body of water at the surface of the liquid therein to create a surface current in said tank to cause said ice particles to overflow, an adjustable gate or weir for regulating the height of such overflow, and means comprising a collecting pipe or spout normally stationary and serving to gather only the upper layer of fluid or semifluid mass containing the bulk of the ice particles.

2. The combination in an apparatus of the character described, of the freezing-tank, ice-forming means located within said tank, means for discharging the ice from said tank by a surface current created and maintained at the surface of the liquid therein, whereby said ice is caused to overflow, an adjustable weir or gate for regulating the height of such overflow, and means for conveying said ice to a compression-chamber, said means comprising a collecting pipe or spout normally stationary and serving to collect only the upper layer of the fluid or semifluid mass which contains the bulk of the ice particles.

3. The combination in an apparatus of the character described, of the freezing-tank, ice-forming means located within said tank, a receiving-tank, a pipe within said receiving-tank for leading the ice particles away, an enlarged spout carried by said pipe and extending across the receiving-tank, and an adjustable gate or weir between the freezing-tank and the receiving-tank whereby the height of discharge from the freezing-tank may be regulated so that the ice particles may be delivered to the spout and the surplus water emptied into the tank.

4. The combination in an apparatus of the character described, of the freezing-tank, ice-forming means in said tank, a receiving-tank, a pipe within said receiving-tank having an enlarged spout adjacent to the discharge from the freezing-tank, adjusting means for said pipe, and a flexible connection for the lower portion of said pipe whereby adjustment of the same may be readily accomplished to insure the reception of the ice particles discharged from the freezing-tank, and the discharge of the surplus water into the receiving-tank.

5. The combination in an apparatus of the character described, of the freezing-tank, ice-forming means located within said tank, a receiving-tank, a pipe within said receiving-tank having an enlarged spout adjacent to the discharge from the freezing-tank, a perforated plate located between the freezing-tank and the receiving-tank over which the ice and water pass, said plate allowing the surplus water to pass into the tank while the ice particles with a minimum quantity of water will pass directly to the spout, means for raising and lowering said plate, and means for adjusting the spout from and toward the same depending upon the volume of material passing over it.

In testimony whereof I have signed my name to this specification in the presence of two subscribing witnesses.

SOMMERS N. SMITH.

Witnesses:
MURRAY C. BOYER,
JOS. H. KLEIN.